(12) United States Patent
Hirayama

(10) Patent No.: US 7,891,997 B2
(45) Date of Patent: Feb. 22, 2011

(54) CONNECTOR FOR AN ELECTRONIC CARD

(75) Inventor: Takaaki Hirayama, Odawara (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 12/307,632

(22) PCT Filed: Jul. 9, 2007

(86) PCT No.: PCT/US2007/015657

§ 371 (c)(1),
(2), (4) Date: Sep. 17, 2009

(87) PCT Pub. No.: WO2008/005563

PCT Pub. Date: Jan. 10, 2008

(65) Prior Publication Data

US 2010/0009562 A1    Jan. 14, 2010

(30) Foreign Application Priority Data

Jul. 7, 2006    (JP) .............................. 2006-188447

(51) Int. Cl.
*H01R 13/62* (2006.01)
(52) U.S. Cl. ..................................................... 439/159
(58) Field of Classification Search ................. 439/159, 439/152, 160
See application file for complete search history.

(56) References Cited

U.S. PATENT DOCUMENTS 6,685,490 B1 * 2/2004 Xue et al. .................... 439/159
7,314,380 B2 * 1/2008 Kodera et al. ............... 439/159
2004/0266238 A1   12/2004 Chou
2005/0277319 A1   12/2005 Kodera et al.

FOREIGN PATENT DOCUMENTS

| JP | 08-236205 | 9/1996 |
|---|---|---|
| JP | 2003-006576 | 1/2003 |
| JP | 2004-039437 | 2/2004 |
| JP | 2006-019186 | 1/2006 |
| WO | WO 2005/078643 A1 | 8/2005 |
| WO | WO 2007/113620 A2 | 10/2007 |

OTHER PUBLICATIONS

International Search Report for PCT/US2007/015657.

* cited by examiner

*Primary Examiner*—Neil Abrams
(74) *Attorney, Agent, or Firm*—Timothy M. Morella

(57) ABSTRACT

A card connector (1) includes an insulative housing and a plurality of conductive terminals mounted on the housing. A card guiding mechanism has a slide member for guiding the electronic card as it moves within the card connector. The slide member is moveable along a path between an initial card insertion position and a fully inserted position. An urging member urges the slide member in a direction opposite to the card insertion direction to thereby ejecting a card by moving the slide member. A shell is mounted on the housing and covers at least the slide member and a part of the electronic card upon insertion of the card into the card connector. One of the housing and the shell has a guide surface with a bulge projecting into the path of the slide member and upon movement of the slide member from the fully inserted position to the initial card insertion position, the slide member engages the bulge (62; 11j) to slow the movement of the slide member.

18 Claims, 7 Drawing Sheets

CONNECTOR FOR AN ELECTRONIC CARD

BACKGROUND OF THE INVENTION

The present invention relates to a connector for an electronic card.

Conventionally, electronic equipments such as personal computers, portable telephones, PDAs personal digital assistants), digital cameras, video cameras, music players, game machines, and car navigation systems, are equipped with card connectors in order to use various kinds of memory cards such as an SIM (subscriber identity module) card, an MMC (R) (multi media card), an SD (R) (secure digital) card, a mini SD (R) card, an xD picture card (R) (xD-Picture card), a memory stick (R), a memory stick Duo (R), a smart media (R), a TransFlash (R) memory card, a micro SD (R) card, and the like.

Generally, a recent card connector, from the view point of usability, has a push-push structure in which a user operates a memory card as if as a pushing, both in case of inserting and removing the same. A card connector having the push-push structure is formed, when ejecting the memory card, so as to move a slide member engaging and holding the memory card by the repulsion of a spring, however, it may be difficult to remove the memory card in some cases since the engagement between the memory card and the slide member is not released. Hence, there has been provided a proposal of the technique for movably mounting a card locking member on a slide member and moving the card locking member, when ejecting the memory card, in order to release the engagement with a memory card (refer to, for example, Japanese Patent Application Laid-Open (Kokai) No. 2003-6576).

In FIG. 8, a reference numeral 801 denotes a slide member being mounted on a side of the housing of a card connector. An engaging projection 803 and a card locking member 804 engage with a memory card (not shown), and thereby the slide member 801 slides in a front to back direction as viewed in the figure, while holding the memory card. The slide member 801 is urged in a direction of ejecting the memory card (downwardly as viewed in FIG. 8) by a coil spring 802. Here, a hollow 805 is formed on the upper surface of the slide member 801, and the card locking member 804 is held in the hollow 805. The upper end thereof is pivotally connected to the slide member 801, and thereby the card locking member 804 rotates around the upper end. An engaging portion 804a being formed at a lower end of the card locking member 804 is formed so as to project from an opening 806 being formed on the left side surface of the hollow 805 to the inside of the housing and so as to engage with a concave portion at a side surface of the memory card.

The tip of the engaging portion 804a projects to the bottom surface of the housing, and abuts on a tilting surface 808 being formed on the side surface of a card guide 807 being formed on the bottom surface of the housing. Therefore, at the time of ejecting the memory card from the housing, if the slide member 801 is moved in the direction of ejecting the memory card by the coil spring 802, the tip of the engaging portion 804a moves along the tilting surface 808, and therefore the engaging portion 804a is moved in a direction away from the side surface of the memory card. Since this releases the engagement of the engaging portion 804a with the concave portion of the side surface of the memory card, the memory card is released from holding by the slide member 801, and it is possible to remove the memory card therefrom.

However, since, in the conventional card connector, the memory card is slid by the urging force of the coil spring 802 at the time of being ejected, the moving velocity of the memory card and the slide member 801 holding the memory card is increased, and the memory card may jump out forcibly. Therefore, the memory card may fall down and thereby may cause damage or loss. Further, the slide member 801 may collide with a stopper member (not shown) to generate a shock, and this may cause a breakage of the card, and damage of the electronic components or the like within the card.

SUMMARY OF THE INVENTION

It is an object of the present invention, in order to solve the problem encountered by the conventional card connector, to provide a card connector wherein by forming a bulge on a guide surface guiding a slide member in a card guiding mechanism for guiding a card, the slide member abuts on the bulge and decreases the moving velocity thereof so that a card may not jump out at the time of ejecting a card, and any shock may not generate when the slide member stops.

To this end, a card connector according to an embodiment of the present invention comprises a housing for holding a card having a terminal member, a connecting terminal mounted on the housing and coming into contact with the terminal member of the card, a card guiding mechanism having a slide member holding and sliding the card inserted into the housing, and an urging member urging the slide member in a direction opposite to an insertion direction of the card and ejecting the card by moving the slide member from an end point to the direction opposite to the insertion direction with an urging force of the urging member, and a case being mounted on the housing and covering at least the slide member and a part of the card inserted into the housing, wherein the housing or the case contains a guide surface having a bulge thereon and guiding the slide member, and the slide member is slowed down by abutting on the bulge when ejecting the card, and stops by abutting on a stopper portion of the housing, and thereby the slide member tilts so as to be able to release holding of the card.

In another card connector according to the present invention, the housing or the case contains a guide surface guiding the slide member in the insertion direction and the direction opposite to the insertion direction, and on the guide surface, a bulge is formed, which abuts on the slide member by movement of the slide member to slow down the slide member, and separates the slide member from the guide surface so as to become rotatable with respect to the housing or the case.

This bulge renders the slide member to become rotatable with respect to the housing or the case, and thereby it is possible to easily release the holding of the card when the card is going to be mounted on or removed from the connector.

In still other card connector according to the present invention, the slide member tilts when stopping by abutting on the stopper portion of the housing, and if the card is drawn out, the slide member thereby further tilts and comes into the state of being able to release the holding of the card.

In still other card connector according to the present invention, the bulge is further formed at a site in which the terminal member abuts on the slide member after the terminal member has come into non-contact with the connecting terminal.

In still other card connector according to the present invention, the slide member has a card pressing portion abutting on the card and transmitting a pressing force to the card, a card locking portion engaging with a concave portion of the card, an urging force receiving portion being subjected to an urging force of the urging member, and a stopper abutting portion abutting on the stopper portion and stopping the stopper portion from moving in the direction opposite to the insertion direction, and the card pressing portion, the card locking portion, the urging force receiving portion, and the stopper abutting portion are formed integrally with the slide member, and the urging force receiving portion and the stopper abutting portion are offset.

In still other card connector according to the present invention, the slide member has a slide cam part engaging with a cam follower, a card pressing portion abutting on the card and transmitting a pressing force to the card, a card locking portion engaging with the concave portion of the card, an urging force receiving portion being subjected to an urging force of the urging member, and a stopper abutting portion abutting on the stopper portion and stopping the stopper portion from moving in the direction opposite to the insertion direction, and the slide cam part, the card pressing portion, the card locking portion, the urging force receiving portion, and the stopper abutting portion are formed integrally with the slide member, and the urging force receiving portion and the stopper abutting portion are offset.

In still other card connector according to the present invention, the card locking portion releases the engagement of the card with the concave portion when the slide member tilts.

In accordance with the present invention, the card connector has the bulge being formed on the guide surface for guiding the slide member of the card guiding mechanism for guiding a card. This renders the slide member to abut on the bulge to decrease the velocity thereof and prevents the card from jumping out, at the time of ejecting the card, thereby preventing any shock from generating when the slide member stops.

A card connector includes an insulative housing and a plurality of conductive terminals mounted on the housing and configured to contact respective ones of contact pads of an electronic card upon insertion of the card into the connector. A card guiding mechanism has a slide member for guiding the electronic card as it moves within the card connector. The slide member is moveable along a path between an initial card insertion position and a fully inserted position. An urging member urges the slide member in a direction opposite to the card insertion direction to thereby ejecting the card by moving the slide member. A shell is mounted on the housing and covers at least the slide member and a part of the electronic card upon insertion of the card into the card connector. One of the housing and the shell has a guide surface with a bulge projecting into the path of the slide member and upon movement of the slide member from the fully inserted position to the initial card insertion position, the slide member engages the bulge to slow the movement of the slide member.

Other aspects, objects and advantages of the present invention will be understood from the following description according to the preferred embodiments of the present invention, specifically including stated and unstated combinations of the various features which are described herein and relevant information which is shown in the accompanying drawings and examples.

BRIEF DESCRIPTION OF THE DRAWINGS

FIG. 7A illustrates a state of viewing the card and the slide member from below in FIGS. 5A to 5C, and FIGS. 6A to 6C; and FIG. 7B illustrates a state of viewing the card and the slide member from below in FIG. 6D.

DESCRIPTION OF THE PREFERRED EMBODIMENTS

Figure 1:
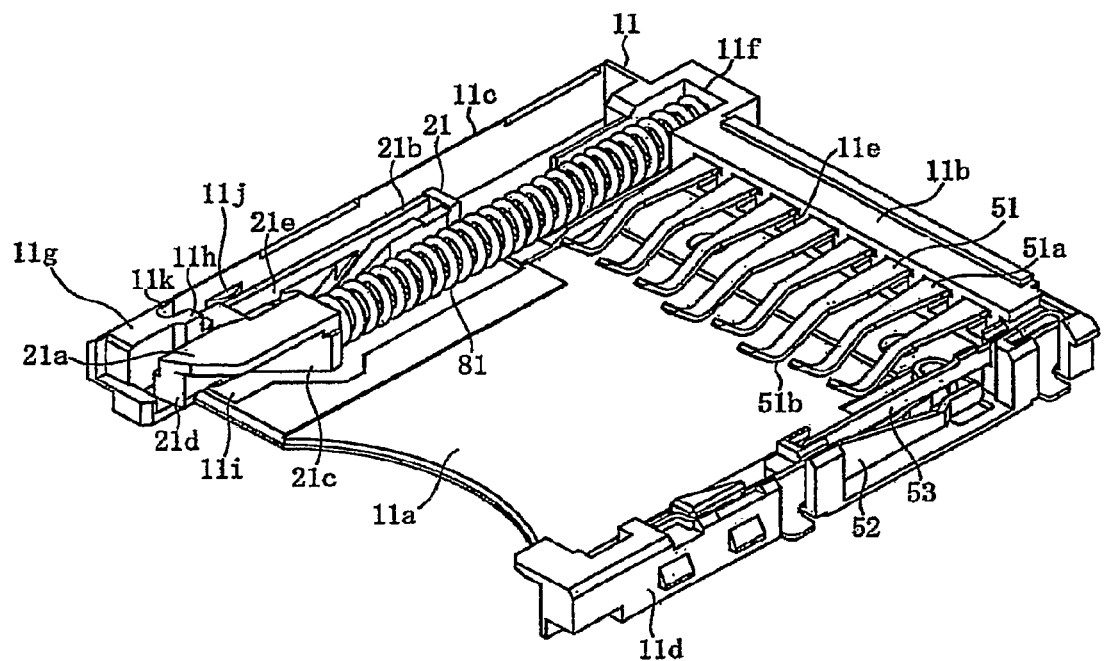
FIG. 1 is a perspective view illustrating a state in which a shell of a card connector is removed therefrom in a preferred embodiment.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

In the figures, a reference numeral 1 denotes a card connector of the present embodiment, which is mounted on electronic equipment (not shown). A card 101 is inserted in the card connector 1, and the card 101 is mounted on the electronic equipment through the card connector 1. The electronic equipment is, for example, a personal computer, a portable telephone, a PDA, a digital camera, a video camera, a music player, a game machine, a car navigation system, or the like and may be any type of equipment.

Figure 2:
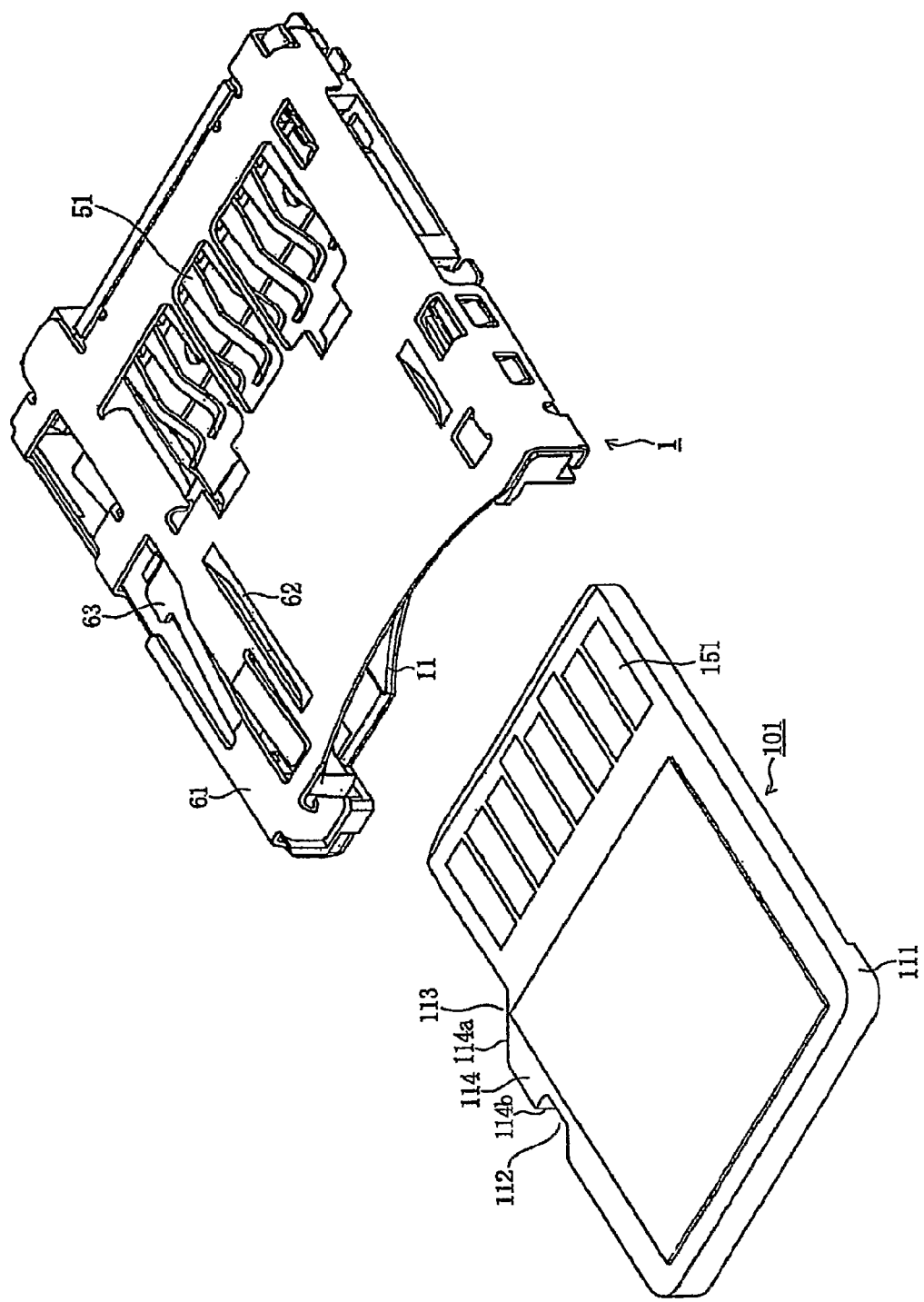
FIG. 2 is a perspective view illustrating the card connector in the preferred embodiment.
Figure 3:
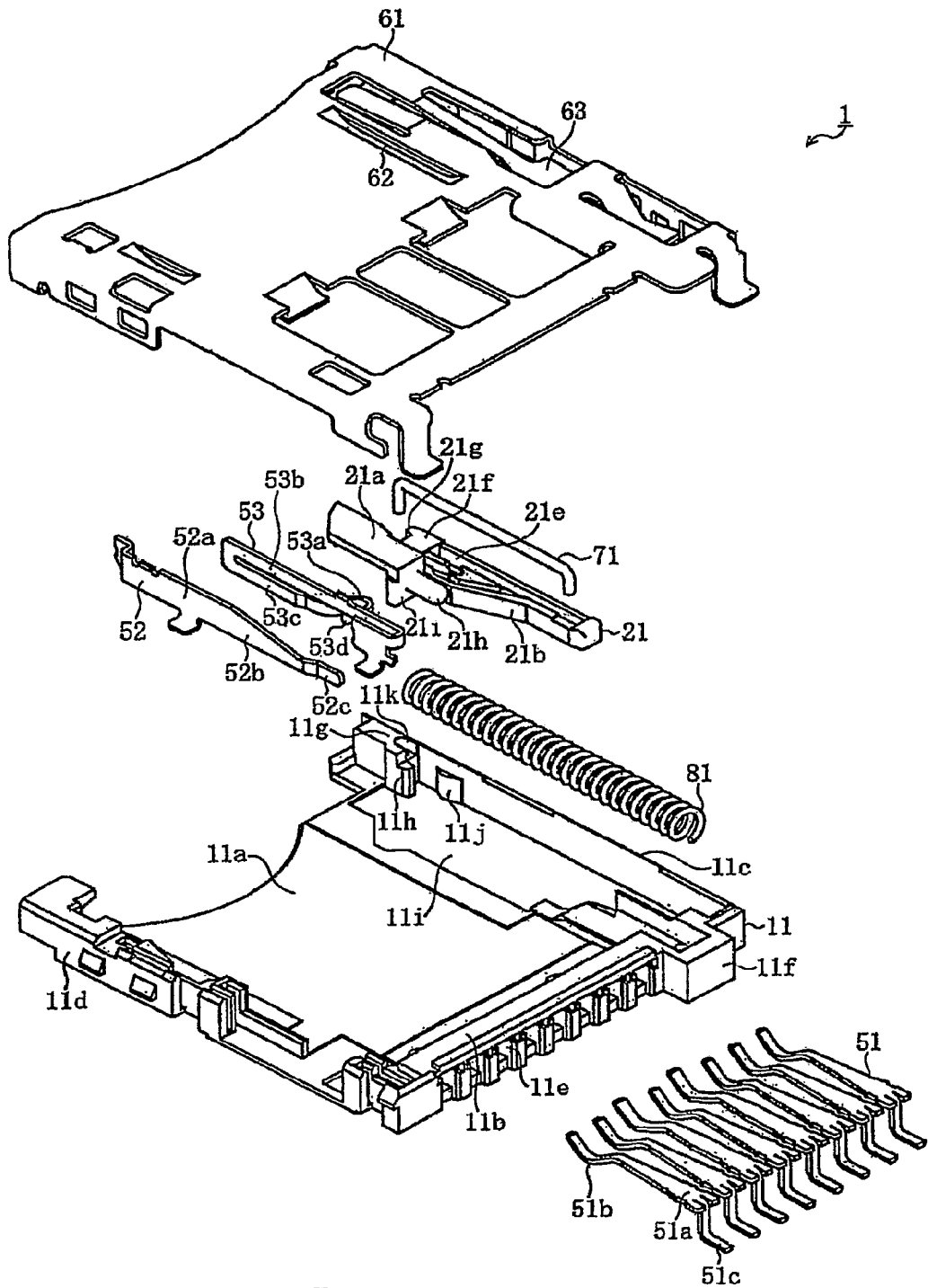
FIG. 3 is an exploded view illustrating the structure of the card connector in the preferred embodiment.

The card 101 has a nearly rectangular shape, and has a card housing 111 integrally molded of an insulating material such as synthetic resin. In a portion nearer the front end on one surface of the card housing 111, a plurality of contact pads 151 as terminal members are disposed in the state of exposure, as shown in FIG. 2. The card 101 has a cut-away part 113 being formed at a portion nearer the front end on one side surface, and a concave portion 112 being formed at a portion nearer the rear end from the cut-away part 113 on the side surface. In addition, on the other side surface facing the side surface, neither a cut-away part nor a concave portion is formed, and the other side surface extends linearly in an insertion direction of the card 101.

The card 101 also has, on the one side surface, an engaging convex portion 114 being defined by the cut-away part 113 and the concave portion 112. A front side engaging surface 114a of the engaging convex portion 114 is defined by the cut-away part 113, forming a tapered surface tilting to the insertion direction of the card 101. A rear side engaging surface 114b of the engaging convex portion 114 is defined by the concave portion 112, forming a surface perpendicular to the insertion direction of the card 101.

In the present embodiment, the card 101 is, for example, an MMC (R), an SD (R) card, a mini SD (R) card, an xD picture card (R), a memory stick (R), a memory stick Duo (R), a smart media (R), a TransFlash (R) memory card, a micro SD (R) card, or the like. Description will be made assuming that the card 101 is a micro SD (R) card.

In this embodiment, representations of directions such as up, down, left, right, front, rear, and the like, used for explaining the structure and movement of each part of the card connector 1 are not absolute but relative. These representations are appropriate when each part of the card connector 1 is situated in the attitude shown in the figures, however, if the attitude of the card connector 1 or any part thereof changes, these presentations should be understood being modified according to the change of the position of each part of the connector 1.

Figure 4:
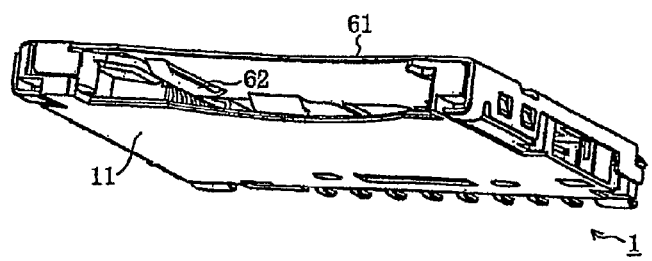
FIG. 4 is a perspective view illustrating a state of viewing the card connector from another direction in the preferred embodiment.

The card connector 1 has a housing 11 being integrally molded of an insulating material such as synthetic resin, and holding the card 101 therein, and a shell 61 as a case being formed by a machining operation including punching, bending, and the like to a plate member being composed of a conductive material such as metal, and being mounted on the upper side of the housing 11. As shown in FIGS. 2 and 4, the card connector 1 has a shape of nearly a flat rectangular parallelepiped, and is mounted on the electronic equipment, from the front side of which the card 101 is inserted therein (from downward toward the left in FIG. 2). The following description will be made on the assumption that the card 101 is inserted into the card connector 1 in such a direction that the surface on which the contact pads 151 of the card 101 are disposed is situated above.

FIG. 1 is also a diagram illustrating the card connector 1 in a state in which the shell 61 is removed therefrom for the convenience of the description. As shown in FIG. 1, the housing 11 has a bottom wall part 11a having such a shape that the front side (on the bottom left side as viewed in FIG. 1) is cut away in nearly a U-shape with respect to the insertion direction of the card 101, and a rear wall part 11b extending along the edge of the rear side at the rear of the bottom wall part 11a, and standing vertically from the bottom wall part 11a. On the rear wall part 11b, a plurality of terminal loading slots 11e being formed so as to pass through in a front to back direction are formed, and the main bodies 51a of terminals 51 as connecting terminals are inserted and mounted in the terminal loading slots 11e, respectively. The terminals 51 extend to the front edge side of the housing 11 to form contact portions 51b projecting downward in the vicinity of the tips thereof, which come into contact with the contact pads 151 disposed on the upward surface of the card 101 and are electrically connected thereto. Solder tail portions 51c bending from the roots of main body portions 51a of the terminals 51 and extending project backward from the edge of the rear side of the bottom wall part 11a, and are electrically connected to signal lines, contact pads, and terminals, etc., which are formed on a wiring substrate or the like in the electronic equipment, namely to the objective terminal members by soldering or the like.

The housing 11 has a first side part 11c as a side part extending in a front to back direction along one side edge of the bottom wall part 11a, and a second side part 11d as a side part extending in a front to back direction along the other side edge of the bottom wall part 11a.

The card connector 1 requires an operation of pushing the card 101 both at the time of inserting the card 101 into the card connector 1 and the time of ejecting the card 101 from the card connector 1, which is so-called an operation of push-in/push-out type or push-push type. Therefore, a slide member 21 in a card guiding mechanism for guiding the card 101 inserted into the card connector 1 is mounted on the first side part 11c so as to be slidable in a front to back direction, namely in the insertion direction of the card 101. A holding recess part 11i is formed along the first side part 11c on the upper surface of the bottom wall part 11a, and the slide member 21 is slidably held in the holding recess part 11i.

The slide member 21 is composed of a card holding part 21a for holding the card 101, and a slide cam part 21b functioning as a slide cam in a cam mechanism for performing an operation of push-push type. The card holding part 21a and the slide cam part 21b are formed integrally. The card holding part 21a has a card pressing portion 21c abutting on the card 101 and transmitting a pressing force to the card, and a card locking portion 21d engaging with the concave portion 112 of the card 101. Specifically, the card pressing portion 21c abuts on a front engaging surface 114a as an edge located ahead of the insertion direction of the card 101 in the engaging convex portion 114 being formed on one side surface of the card 101 to transmit a pressing force to the card. And, the card locking portion 21d engages on a rear side engaging surface 114b as an edge located rear in the insertion direction of the card 101 in the engaging convex portion 114. The card pressing portion 21c and the card locking portion 21d function as a card engaging portion of the slide member 21, and are formed integrally as a part of the card holding part 21a, so as to project inwardly of the housing 11. The slide member 21 holds the card 101 by the card pressing portion 21c and the card locking portion 21d of the card holding part 21a, and moves in a front to back direction together with the card 101.

An end surface located ahead of the insertion direction of the card 101 in the card holding part 21a functions as an urging force receiving portions 21i being subjected to the urging force of an urging member 81 being composed of a coil spring, and has an urging member restraining projection 21h for engaging the urging member 81, on which one end of the urging member 81 is mounted. The other end of the urging member 81 is mounted on a restraining part 11f of the rear wall part 11b. The restraining part 11f also has an urging member engaging projection (not being shown) engaging with the urging member 81. This renders the slide member 21 to be always urged by the urging member 81 in the direction opposite to the insertion direction of the card 101, namely in the ejecting direction of the card 101.

On the other hand, the slide cam portion 21b is connected to the external side surface of the card holding part 21a, namely to the side surface facing the external side of the housing 11, and extends ahead of the insertion direction of the card 101. A cam groove 21e as a slide cam is formed on the upper surface of the slide cam part 21b, and one end of an elongated pin member 71 as a cam follower is engaged with the cam groove 21e. For the convenience of the description, illustration of the pin member 71 is omitted in FIG. 1.

The other end of the pin member 71 is engaged and pivotally connected with a pin restraining portion 11k being formed on the upper surface of the stopper portion 11g being formed at the front end of the first side part 11c of the housing 11. Collaboration of the pin member 71 and the cam groove 21e renders the slide member 21 moving together with the card 101 to perform a push-push operation. This enables the card guiding mechanism to move the card 101 from the end point to the direction opposite to the insertion direction and to eject the card 101 with the urging force of the urging member 81, when the card 101 is moved in the insertion direction and reaches the end point by the push operation of pushing the card 101 in the insertion direction. Since the cam mechanism for performing the push-push operation, which is composed of the pin member 71 and the cam groove 21e is well known, the description thereof is omitted here.

The end surface located ahead of the insertion direction of the card 101 in the stopper portion 11g functions as a stopper surface for stopping the slide member 21 moving so as to eject the card 101. When the slide member 21 is moved in the direction opposite to the insertion direction of the card 101 with the urging force of the urging member 81, the end surface located at the rear of the insertion direction of the card 101 in the slide member 21 functions as a stopper surface to abut on the stopper surface of the stopper portion 11g, and thereby the slide member 21 is stopped. On the stopper surface of the stopper portion 11g, an engaging projection 11h is formed, and on the stopper surface of the slide member 21, an engaging projection 21g is formed. In a state in which the slide member 21 abuts on the stopper portion 11g, the engaging projection 11h and the engaging projection 21g are engaged with each other.

In the initial state before inserting the card 101 into the card connector 1, the slide member 21 is urged in the direction opposite to the insertion direction of the card 101 with the urging force of the urging member 81, and is pressed and stopped by the stopper portion 11g. Here, the urging force receiving portion 21i being subjected to the urging force of the urging member 81 is the end surface of the card holding part 21a, whereas the stopper abutting portion 21f abutting on the stopper surface of the stopper portion 11g is the end surface of the slide cam part 21b being connected to the side surface located lateral to the card holding part 21a. That is, the stopper abutting portion 21f is located in a direction lateral to the urging force receiving portion 21i with respect to the direction of action of the urging force of the urging member 81 (to a front to back direction of the housing 11). Further, in other words, the urging force receiving portion 21i that is a point of action of the urging force exerted by the urging member 81, and the stopper abutting portion 21f that is a point of action of the repulsion of the urging force exerted by the stopper portion 11g are offset. Therefore, as will be described later, a rotational moment for rotating the slide member 21 in the clockwise direction as viewed from above generates, and the slide member 21 is rotated in the clockwise direction, because sufficient allowance in the width direction of the card connector 1 is used around the slide member 21, thereby coming into the state of tilting. That is, in this initial state, the shaft in the longitudinal direction of the card holding part 21a, and the shaft in the longitudinal direction of the slide cam part 21b tilt in the clockwise direction with respect to the front to back direction of the housing 11, around the stopper abutting portion 21f that is a point of action of the reaction force of the urging forth being subjected to the stopper portion 11g.

When the slide member 21 slides in a front to back direction along with the card 101, the slide member 21 slides in a state in which the tilt is restored to the original attitude, namely, in a state in which the shaft in the longitudinal direction of the card holding part 21a and the shaft in the longitudinal direction of the slide cam part 21b become parallel to the front to back direction of the housing 11. In this case, the slide member 21 slides along the inner wall of the first side part 11c, that is, the inner wall of the first side part 11c functions as a guide surface guiding the slide member 21. On the inner wall of the first side part 11c, a bulge or projection 11j functioning as a slowing down member of the slide member 21 is formed. When the slide member 21 is moved in the direction opposite to the insertion direction of the card 101 with the urging force of the urging member 81, the slide member 21 sliding along the inner wall of the first side part 11c comes into contact with the bulge 11j and slows down by being subjected to the lateral pressure thereof.

It is also possible to form the bulge 11j at any site other than the inner wall of the first side part 11c, as long as the site is a surface functioning as a guide surface for guiding the slide member 21. For example, it is acceptable to form the bulge 11j on the upper surface of the holding recess part 11i, or on a ceiling surface of the shell 61 functioning as the guide surface. In the present embodiment, there will be provided a description of the case in which the bulge 11j is formed on the inner wall of the first side part 11c so that a moving direction may become the direction away from the guide surface of the slide member 21, namely the width direction of the card connector 1.

Preferably, the site in which the bulge 11j is disposed with respect to the slide direction, namely a front to back direction, of the slide member 21 is set so that, when the card 101 is ejected, the slide member 21 abuts on the bulge 11j after the contact pads 151 has actually disengaged with the contact portions 51b of the terminals 51. It should be noted that the bulge 11j reduces the urging force of the urging member 81 and thus slows down the slide member 21 due to the resistance generated when the bulge 11j abuts on the slide member 21. However, the urging force of the urging member 81 would be reduced due to the frictional force of the contact lever without the bulge 11j when the contact pads 151 come into contact with the contact portions 51b of the terminals 51. Therefore, if the slide member 21 and the bulge 11j abut each other when the contact pads 151 come into contact with the contact portions 51b of the terminals 51, the reduction in the urging force of the urging member 81 will be too great and, in order to facilitate ejection of the card 101, it will become necessary to increase the urging force of the urging member 81.

In the present embodiment, there is no need to enhance the urging force of the urging member 81, since the bulge 11j is disposed on such a site abutting the slide member 21 after the contact pads 151 have actually come into non-contact with the contact portions 51b of the terminals 51. Hence, at the time of ejecting the card 101, the slide member 21 is properly slowed down, and thereby the card 101 is prevented from jumping out. Further, significant shock forces will be avoided when the slide member 21 abuts on the stopper portion 11g and comes to a stop.

A first contact member 52 and a second contact member 53 for forming a switch are mounted on the second side part 11d. While the first contact member 52 and the second contact member 53 come into an electrically conductive state or an electrically non-conductive state depending on mutually contacting and separating, the first contact member 52 and the second contact member 53 function as switches. Here, relevant switch can be used for various applications such as a detection switch for detecting that the card 101 is properly inserted into the card connector 1, a write protect switch for protecting new information from being written into the card 101, or the like. However, in the present embodiment, a description will be made assuming that the switch is used as a detection switch. More particularly, the switch is used as a sidewall installation type and an initial-OFF type of a detection switch.

The first contact member 52 has a root portion 52a mounted on the second side part 11d, and a main body portion 52b in such a shape as an elongated cantilever extending from the root portion 52a to the rear wall part 11b. The first contact member 52 is a member formed by applying a machining operation including punching, bending, and the like to a plate member composed of a conductive material with resiliency such as metal. The main body portion 52b and the root portion 52a of the first contact member 52 are disposed so as to become nearly parallel to the side surface of the second side part 11d.

The second contact member 53 has an elongated upper side part 53b mounted on the second side part 11d, and a lower side part 53c in such a shape as an elongated cantilever extending from one end of the upper side part 53b to the direction of the rear wall part 11b. The second contact member 53 is a member also formed by applying a machining operation including punching, bending, and the like to a plate member composed of a conductive material with resiliency such as metal, and the upper side part 53*b* and the lower side part 53*c* are disposed so as to become nearly parallel to the side surface of the second side part 11*d*. Further, a projection-like card abutting portion 53*a* projecting toward the inside of the housing 11 is formed at a free end of the lower side part 53*c*.

In the initial state in which the card 101 is not inserted into the connector 1, the vicinity of the free end of the second contact member 53, namely the second abutting portion 53*d*, is located at more inward of the housing 11 than the vicinity of the free end of the first contact member 52, namely the first abutting portion 52*c*, and is apart from the first abutting portion 52*c*. Therefore, the switch is turned off. When the card 101 is then inserted into the card connector 1 and reaches a predetermined position, the side surface of the tip in the insertion direction of the card 101 abuts on the card abutting portion 53*a* of the second contact member 53, and moves the free end of the second contact member 53 to the outside of the housing 11. Consequently, the second abutting portion 53*d* of the second contact member 53 abuts on the first abutting portion 52*c* of the first contact member 52, and thereby the first contact member 52 and the second contact member 53 are electrically conducted. Hence, this renders the switch to turn on, and enables to detect that the card 101 is properly inserted into the card connector 1.

The shell 61 also has a guide part 62 and a pin pressing part 63. The guide part 62 is formed by applying drawing and bending processes to a part of the shell 61 in the direction of the bottom wall part 11*a* of the housing 11, and as shown in FIG. 4, projects downward from the ceiling surface of the shell 61, as well as extending in the slide direction of the slide member 21, namely in a front to back direction. The guide member 62, facing the inner wall of the first side part 11*c*, guides the slide member 21, and restrains the slide member 21 from moving to the inside of the housing 11. Since the slide member 21 is also restrained by the first side part 11*c* and the guide part 62, it is possible to omit the holding recess part 11*i*. The pin pressing part 63 is a member in the form of a plate spring, which is formed by applying a bending process to a part of the shell 61 so as to be able to press in the direction of the bottom wall part 11*a* of the housing 11. The pin member 71 is positioned between the pin pressing part 63 and the slide member 21 or the housing 11, and is held so as not to disengage from the slide member 21 or the housing 11.

As stated above, the description has been made focusing on that the card 101 is in the initial state of not being inserted into the card connector 1. Next, the operation of the card connector 1 having the composition will be described.

To insert the card 101 into the card connector 1, a user inserts the card 101 from the front of the card connector 1. The card 101 is inserted in such an attitude as shown in FIG. 2 into the card connector 1. In the initial state of insertion, the contact pads 151 of the card 101 have not reached the contact portions 51*b* of the terminals 51. The engaging convex portion 114 of the card 101 is not engaged with the card pressing portion 21*c* and the card locking portion 21*d*, as the card engaging portion of the slide member 21. The slide member 21 is stopped with the stopper abutting portion 21*f* abutting on the stopper portion 11*g* of the housing 11. Further, the first contact member 52 does not abut on the second contact member 53, and the detection switch is in the OFF-state.

Subsequently, when the user pushes the card 101 and further squeezing the same into the card connector 1, the front engaging surface 114*a* of the engaging convex portion 114 of the card 101 abuts on the card pressing portion 21*c* of the slide member 21. In this case, since the pressing force exerted by the user is stronger than the urging force of the urging member 81, a rotational moment for rotating the slide member 21 in the clockwise direction will vanish. Strictly speaking, since during the initial period, the card pressing portion 21*c* abuts on the front engaging surface 114*a* of the engaging convex portion 114 and is pressed, a rotational moment for rotating the slide member in the counterclockwise direction generates in the card holding part 21*a*. This renders the whole of the slide member 21 to rotate in the counterclockwise direction and restores the tilt in the initial state before inserting the card 101 into the card connector 1 to the original attitude, thereby the shaft in the longitudinal direction of the card holding part 21*a* and the shaft in the longitudinal direction of the slide cam part 21*b* becoming parallel to the front to back direction of the housing 11.

When the tilt of the slide member 21 is restored to the original attitude, the card locking portion 21*d* enters into the concave portion 112 of the card 101 and engages with the rear engaging surface 114*b* of the engaging convex portion 114. This renders the card holding part 21*a* to come into a state of holding the card 101 with the engaging convex portion 114 being grasped from back and forth by the card pressing portion 21*c* and the card locking portion 21*d*, and enables the slide member 21 to be integrated with the card 101 and to move in a front to back direction.

Then, when the user pushes the card 101, the card 101 moves along with the slide member 21 to the rear wall part 11*b*. In this case, the pressing force exerted by the user is transmitted from the engaging convex portion 114 of the card 101 to the slide member 21 through the card pressing portion 21*c*. Since the slide member 21 compresses the urging member 81 composed of the coil spring, the slide member 21 and the card 101 are subjected to a repulsion of the urging member 81, however, the slide member 21 and the card 101 move against the repulsion, since this repulsion is weaker than the pressing force exerted by the user. In this case, the slide member 21 slides under the restriction of a lateral movement by the inner wall of the first side part 11*c* and the guide part 62 of the shell 61. The slide member 21 and the card 101 then reach the end point as the most advanced position, and come into a full-stroke state.

On the way of the path until the card 101 reaches the end point, the contact pads 151 come into contact with the contact portions 51*b* of the terminals 51 to become electrically conductive each other. Further, the side surface located opposite to the engaging convex portion 114 of the tip in the insertion direction of the card 101 abuts on the card abutting portion 53*a* of the second contact member 53, and moves the free end of the second contact member 53 to the outward of the housing 11. Therefore, the second abutting portion 53*d* of the second contact member 53 abuts on the first abutting portion 52*c* of the first contact member 52, and the first contact member 52 and the second contact member 53 become electrically conductive. This renders the switch to turn ON, and enables to detect that the card 101 is properly inserted into the card connector 1.

Subsequently, when the user stops the operation of pushing the card 101 to release the pressing force against the card 101, the slide member 21 and the card 101 are moved in the direction away from the rear wall part 11*b* with the repulsion of the urging member 81. And then, the slide member 21 and the card 101 stop in a locking position in which the card 101 is held under a locked state in the card connector 1. This is because the pin member 71 engaging with the cam groove 21*e* of the slide cam part 21*b* restrains at a part of the cam groove 21*e* to cause the slide cam part 21*b* to stop movement, and thereby renders the slide member 21 to stop in the locking position.

The card 101, by being held in the locking position, comes into the state of being able to send and receive data with operation means and the like of the electronic equipment on which the card connector 1 is mounted. When the card 101 is held in the locking position, the contact pads 151 of the card 101 come into contact with the contact portions 51b of the terminals 51, and are in electrically conductive states. Since the first contact member 52 is abutting on the second contact member 53, the detection switch comes into the ON-state.

To eject and remove the card 101 from the card connector 1, the user pushes the card 101 so that the slide member 21 and the card 101 are moved from the locking position toward the rear wall part 11b. Then, when the user further pushes the card 101, as shown in FIG. 5A, the slide member 21 and the card 101 reach the end point defined as the most advanced position, resulting in a full-stroke state.

Subsequently, when the user stops the operation of pushing the card 101 to release the pressing force against the card 101, the slide member 21 and the card 101 are moved in the direction away from the rear wall part 11b with the repulsion of the urging member 81, and are restored to the locking position. At this time, the repulsion of the urging member 81 becomes a pressing force, and is transmitted to the engaging convex portion 114 through the card pressing portion 21c. Since, even if the slide member 21 reaches the locking position, the pin member 71 engaging with the cam groove 21e of the slide cam part 21b does not restrain in a part of the cam groove 21e, the movement of the slide member 21 is not controlled and thereby it is impossible to cause the slide member 21 and the card 101 to stop in the locking position. Consequently, as shown in FIG. 5B, the slide member 21 and the card 101 pass through the locking position, and further move in the direction opposite to the insertion direction of the card 101.

Figure 5:
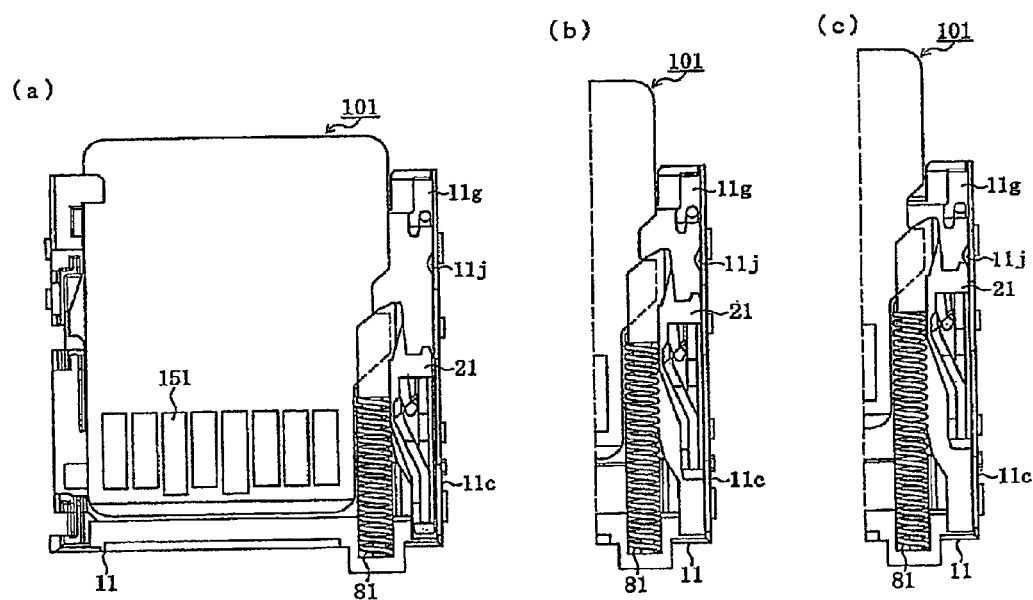
FIGS. 5A to 5C are first diagrams illustrating the operations of a cam mechanism in the preferred embodiment.

As shown in FIG. 5C, a portion which is the end portion on the opposite side of the rear wall part 11b in the slide member 21, and is along the inner wall of the first side part 11c, more particularly, an engaging projection 21g being formed on the stopper surface, abuts on the bulge 11j being formed on the inner wall of the first side part 11c. In this case, since the bulge 11j is disposed at such a site as abutting on the slide member 21 after the contact pads 151 have actually come into non-contact with the contact portions 51b of the terminals 51, the electrically conductive state between the contact pads 151 and the terminals 51 has already been discontinued. Further, the first contact member 52 and the second contact member 53 have come into non-contact with each other, and the detection switch has already come into the OFF-state.

Figure 6:
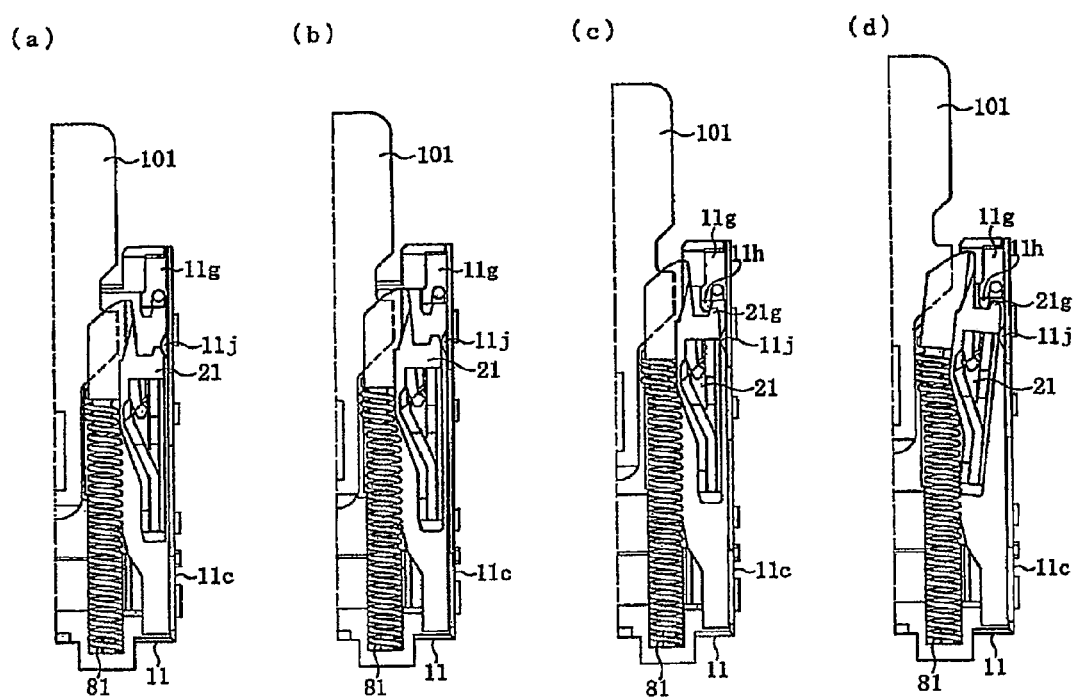
FIGS. 6A to 6D are second diagrams illustrating the operations of the cam mechanism in the preferred embodiment.
Figure 7:
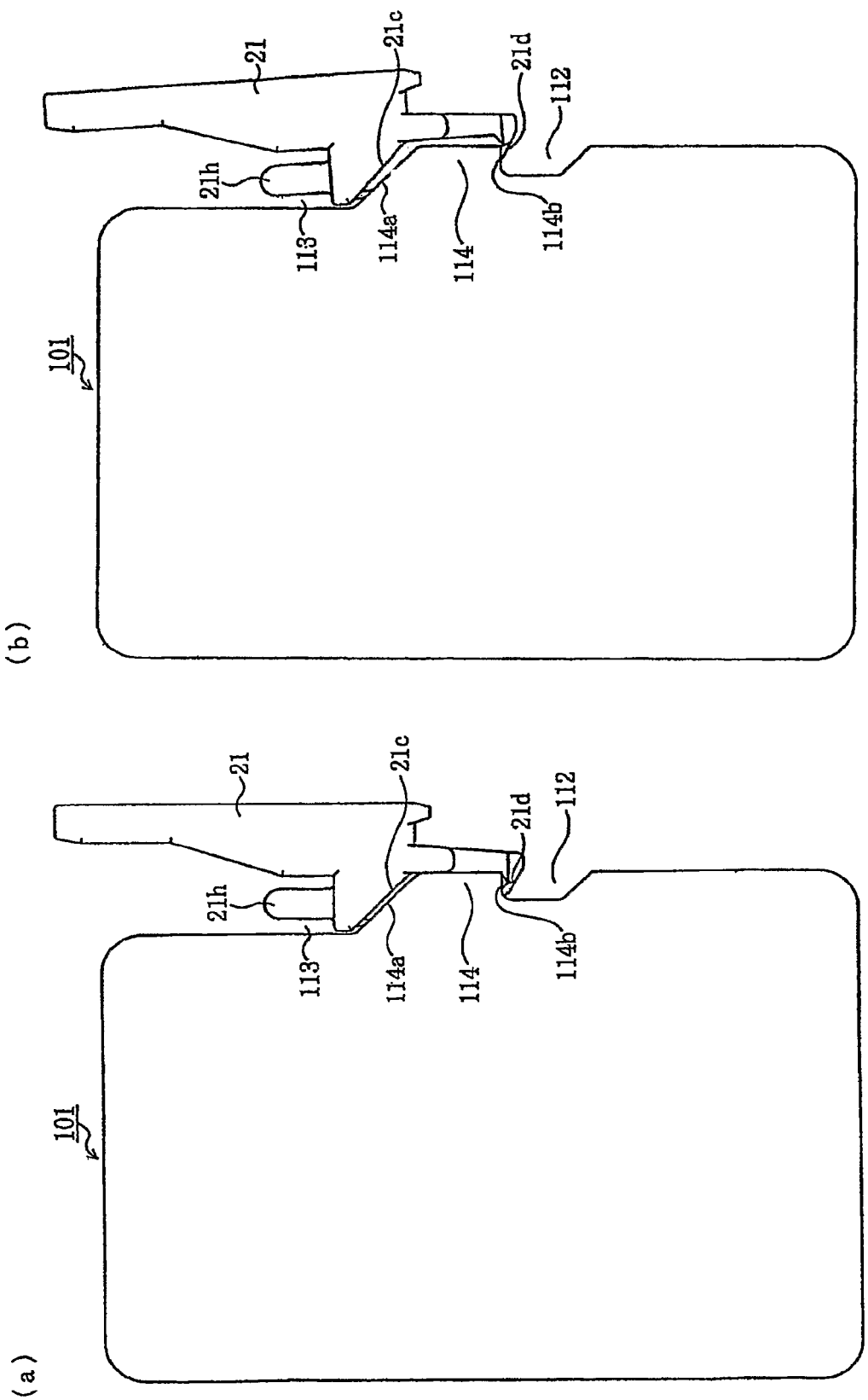
FIGS. 7A and 7B are diagrams illustrating the operation of a card holding part of a slide member in the preferred embodiment.
Figure 8:
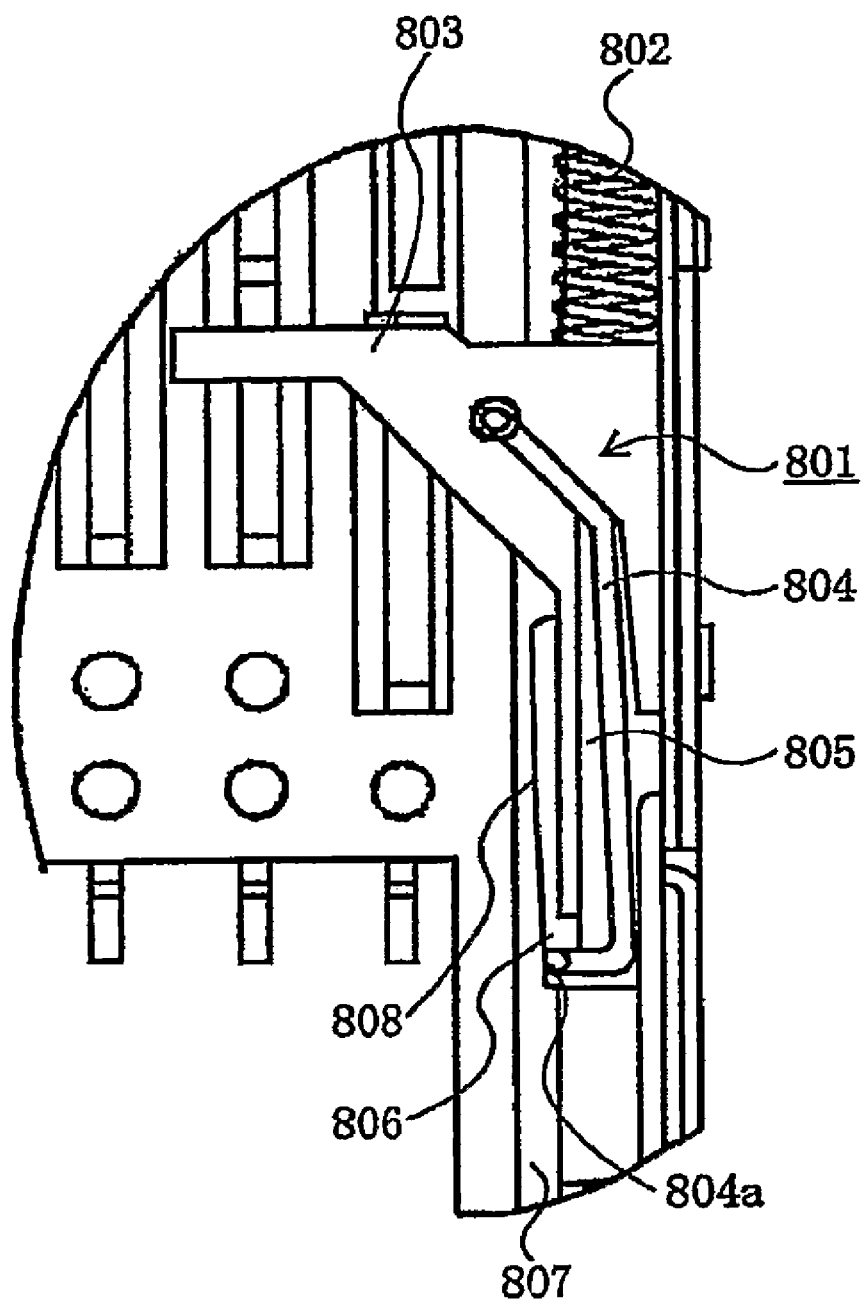
FIG. 8 is a diagram illustrating a conventional card connector.

The slide member 21 slows down by abutting on the bulge 11j. Then, as shown in FIGS. 6A to 6C, with the urging force of the urging member 81, the slide member 21, while abutting on the bulge 11j, is further moved in the direction opposite to the insertion direction of the card 101. As shown in FIG. 7A, since the card pressing portion 21c and the card locking portion 21d of the slide member 21 keep grasping the engaging convex portion 114 from back and forth, the card 101 slows down in the state of being integrated with the slide member 21.

As shown in FIG. 6D, the stopper abutting portion 21f of the slide member 21 abuts on the stopper portion 11g of the housing 11, and thereby the slide member 21 and the card 101 are stopped. On the other hand, the urging force receiving portion 21i of the slide member 21 keeps being subjected to the urging force of the urging member 81. The stopper abutting portion 21f and the urging force receiving portion 21i are offset. Therefore, a rotational moment for rotating the slide member 21 in the clockwise direction in FIG. 6D, namely viewing from above, generates, and the slide member 21 is rotated in the clockwise direction and comes into the state of tilting, by using clearance between the first side part 11c and the engaging projection 21g, which is formed by the slide member 21 abutting on the bulge 11j and running thereon. Since, in the state in which the slide member 21 abuts on the stopper portion 11g, the engaging projection 21g and the engaging projection 11h are engaged with each other, the slide member 21 will not be disengaged from the stopper portion 11g.

As shown in FIG. 7B, tilting of the slide member 21 renders the card locking portion 21d to move outward and thereby renders the amount of engagement between the card locking portion 21d and the rear engaging surface 114b of the engaging convex portion 114 to be reduced. This facilitates release of the state of engagement between the engaging convex portion 114, and the card pressing portion 21c and the card locking portion 21d. Therefore, when the user pulls the card 101, and thereby the slide member 21 is further rotated in the clockwise direction in FIG. 6D and tilts. The state of the engagement between the engaging convex portion 114, and the card pressing portion 21c and the card locking portion 21d is easily released, and the card 101 is disengaged from the slide member 21. Thus, it is possible to easily eject the card 101 from the card connector 1 without adding any large force by being pulled by the user. Alternatively, by changing the height of the bulge 11j and the urging force of the urging member 81, it is also possible to render a rotational moment to act on the slide ember 21 to tilt the same without being pulled by the user.

Thus, in the present embodiment, the card connector 1 has the bulge 11j being formed on the guide surface for guiding the slide member 21. When ejecting the card 101, the slide member 21 slows down by abutting on the bulge 11j, and stops by abutting on the stopper portion 11g of the housing 11, and thereby further tilts to release the holing of the card 101.

Since this renders the slide member 21 to abut on the bulge 11j, and to lower the velocity thereof at the time of ejecting the card 101, the card 101 never jumps out. Also, when the slide member 21 comes to a stop, any shock does not occur. Further, if the user pulls the card 101, thereby it becomes possible to take out the card 101 easily.

The bulge 11j is formed at such a site as abutting on the slide member 21 after the contact pads 151 have actually come into non-contact with the contact portions 51b of the terminals 51. Hence, there is no need to increase the urging force of the urging member 81.

In addition, when the slide member 21 comes to stop by abutting on the stopper portion 11g of the housing 11, the slide member 21 tilts, and if the card 101 is drawn out, the card 101 thereby also further tilts to release the holding of the card 101.

Therefore, the card 101 will not jump out when the slide member 21 comes to stop, and if the user pulls the card 101, it thereby becomes possible to take out the card 101 easily.

The slide member 21 further contains the card pressing portion 21c abutting on the card 101 and transmitting a pressing force, a card locking portion 21d engaging with the concave portion 112 of the card 101, the urging force receiving portion 21i being subjected to an urging force of the urging member 81, and the stopper abutting portion 21f abutting on the stopper portion 11g so as to stop the movement to the direction opposite to the insertion direction. The card pressing portion 21c, the card locking portion 21d, the urging force receiving portion 21i, and the stopper abutting portion 21f are formed integrally with the slide member 21, and the urging force receiving portion 21i and the stopper abutting portion 21*f* are offset. The slide cam portion 21*b* is also formed integrally with the slide member 21.

This enables the slide member 21 to release the holding of the card 101 at the time of ejecting the card 101, even if a mechanism for releasing the holding of the card 101 is not disposed separately. Also, since this enables to simplify the structure of the card 101, lower the costs for manufacturing the same, and downsize the same, it is possible to detach the card 101 easily.

Since the present invention should not be limited to the above-described embodiments, it is possible to transform the embodiments in various ways based on the gist of the present invention, and these transformations are not eliminated from the scope of the present invention.

What is claimed is:

1. A card connector for receiving an electronic card therein, the electronic card having a plurality of contact pads thereon, the card connector comprising:
    an insulative housing;
    a plurality of conductive terminals, each conductive terminal being mounted on the housing and configured to contact a respective contact pad upon insertion of the electronic card into the card connector;
    a card guiding mechanism, the card guiding mechanism having a slide member for guiding the electronic card as it moves within the card connector, the slide member being moveable along a path between a first operative position, at which the electronic card is initially inserted into a receptacle of the card connector in a card insertion direction, and a second operative position, at which the electronic card is fully inserted into the card connector, and an urging member, the urging member for urging the slide member in a direction opposite to the card insertion direction and for ejecting the card by moving the slide member from the second operative position towards the first operative position; and
    a shell, the shell being mounted on the housing and covering at least the slide member and a part of the electronic card upon insertion of the card into the card connector;
    wherein:
        one of the housing and the shell has a guide surface with a bulge projecting into the path of the slide member;
        upon movement of the slide member from the second operative position to the first operative, the slide member engages the bulge to slow the movement of the slide member from the second operative position to the first operative position; and
        the path of the slide member is dimensioned to permit the slide member to separate from the guide surface as the slide member engages the bulge and to rotate relative to the insertion direction.

2. The card connector according to claim 1, wherein the slide member tilts when stopped by abutting on a stopper portion of the housing at the first operative position.

3. The card connector according to claim 2, wherein the slide member further includes a card pressing portion, the card pressing portion for engaging the electronic card and for transmitting a pressing force to the card to move the card from the second operative position to the first operative position.

4. The card connector according to claim 1, wherein the slide member further includes a slide cam part, the slide cam part being engaged with a cam follower.

5. The card connector according to claim 1, wherein a card locking portion of the slider member releases the electronic card when the slide member rotates.

6. The card connector according to claim 1, wherein a card locking portion of the slider member releases the electronic card when the slide member tilts.

7. The card connector according to claim 3, wherein the slide member further includes an urging force receiving portion, the urging force receiving portion being subjected to an urging force of the urging member.

8. The card connector according to claim 7, wherein the slide member further includes a stopper abutting portion, the stopper abutting portion for abutting on the stopper portion and for stopping the stopper portion from moving in the direction opposite to the insertion direction.

9. The card connector according to claim 8, wherein the electronic card further includes a recess in a side edge thereof.

10. The card connector according to claim 9, wherein the slide member further includes a card locking portion for engaging the recess in the electronic card.

11. The card connector according to claim 10, wherein the card pressing portion, the card locking portion, the urging force receiving portion, and the stopper abutting portion are formed integrally as part of the slide member.

12. The card connector according to claim 11, wherein the urging force receiving portion and the stopper abutting portion are offset laterally relative to the insertion direction.

13. The card connector according to claim 4, wherein the slide member further includes a card pressing portion, the card pressing portion being configured to engage the electronic card and transmit a pressing force on the card.

14. The card connector according to claim 13, wherein the slide member further includes a card locking portion, the card locking portion being configured to engage a recessed portion of the card.

15. The card connector according to claim 14, wherein the slide member further includes an urging force receiving portion, the urging force receiving portion being subjected to an urging force of the urging member.

16. The card connector according to claim 15, wherein the slide member further includes a stopper abutting portion, the stopper abutting portion being configured to abut the stopper portion to stop the stopper portion from moving in the direction opposite to the insertion direction.

17. The card connector according to claim 16, wherein the slide cam part, the card pressing portion, the card locking portion, the urging force receiving portion, and the stopper abutting portion are formed integrally as part of the slide member.

18. The card connector according to claim 17, wherein the urging force receiving portion and the stopper abutting portion are offset.

* * * * *